United States Patent [19]
Lansinger

[11] Patent Number: 5,316,359
[45] Date of Patent: May 31, 1994

[54] ANTI-REFLECTIVE AUTOMOTIVE INTERIOR INSTRUMENT PANEL SURFACE

[75] Inventor: Jere R. Lansinger, Bloomfield Hills, Mich.

[73] Assignee: Chrysler Corporation, Highland Park, Mich.

[21] Appl. No.: 28,109

[22] Filed: Mar. 8, 1993

[51] Int. Cl.$^5$ .............................................. B62D 25/14
[52] U.S. Cl. ..................................... 296/70; 296/97.2; 296/97.7; 180/90
[58] Field of Search ................... 296/70, 97.2, 97.7, 296/97.1, 39.1; 180/90; D12/192

[56] References Cited

U.S. PATENT DOCUMENTS

| | | |
|---|---|---|
| 2,207,224 | 7/1940 | Meares . |
| 2,720,932 | 10/1955 | Arpels . |
| 2,818,933 | 1/1958 | Tell . |
| 3,549,469 | 12/1970 | Wilfert . |
| 3,679,887 | 7/1972 | Kennedy . |
| 4,756,603 | 7/1988 | Ohtani . |
| 5,018,832 | 5/1991 | Terunuma et al. . |

FOREIGN PATENT DOCUMENTS

| | | | |
|---|---|---|---|
| 2948721 | 6/1981 | Fed. Rep. of Germany | 180/90 |
| 3004931 | 8/1981 | Fed. Rep. of Germany | 180/90 |
| 3696 | 8/1982 | Fed. Rep. of Germany | 296/97.7 |
| 149219 | 11/1981 | Japan | 180/90 |
| 184933 | 8/1987 | Japan | 296/97.7 |
| 268743 | 11/1987 | Japan | 180/90 |

Primary Examiner—David M. Mitchell
Assistant Examiner—Gary C. Hoge
Attorney, Agent, or Firm—Edward A. Craig

[57] ABSTRACT

An instrument panel for a motor vehicle has a shelf formed with a multiplicity of parallel grooves and ridges to minimize reflected images and glare. The grooves and ridges are generally V-shaped with forwardly and rearwardly facing surfaces. The forwardly facing surfaces are each inclined upwardly and rearwardly at an angle selected to prevent reflection of light upwardly to the windshield and thence into the vehicle operator's eyes or glare directly from the shelf surface into the operator's eyes.

3 Claims, 1 Drawing Sheet

ANTI-REFLECTIVE AUTOMOTIVE INTERIOR INSTRUMENT PANEL SURFACE

This invention relates to an interior instrument panel surface in an automotive vehicle which reduces windshield reflection, and glare directly from the top surface of the instrument panel.

BACKGROUND AND SUMMARY OF THE INVENTION

Sunlight and light from instruments on the dash or instrument panel shelf of modern automotive vehicles with steeply inclined windshields is often reflected as an image or glare by the windshield or glare directly from the surface back toward the driver or operator of the vehicle. This can be annoying to the driver.

It is an object of this invention to provide an interior surface on the instrument panel shelf which will minimize reflection of light upward to the windshield or directly from the shelf surface and thence into the driver's eyes.

In many automobiles on the road today, the instrument panel shelf is flat and smooth and often reflects the image of the panel off the windshield and into the driver's vision much as a mirror will do. This is particularly noticeable when the windshield is positioned at a severe rake or rearward angle. To minimize this, the instrument panel shelf of the present invention has a surface beneath the windshield which is formed with a multiplicity of generally parallel, laterally extending, alternate grooves and ridges. The grooves and ridges are generally V-shaped and each is defined by a forwardly facing surface and a rearwardly facing surface. The forwardly facing surfaces are inclined upwardly and rearwardly at an angle selected to minimize reflection of light upwardly to the windshield and thence into the driver's area of vision.

Other objects are to provide an arrangement for reducing or minimizing reflections which has the foregoing features, is relatively simple to manufacture and install, can be used for a long period of time without alteration, adjustment or repair, and is highly effective in preventing or minimizing the effects of glare.

These and other objects, features and advantages of the invention will become more apparent as the following description proceeds, especially when taken with the accompanying drawings.

DETAILED DESCRIPTION

Figure 1:
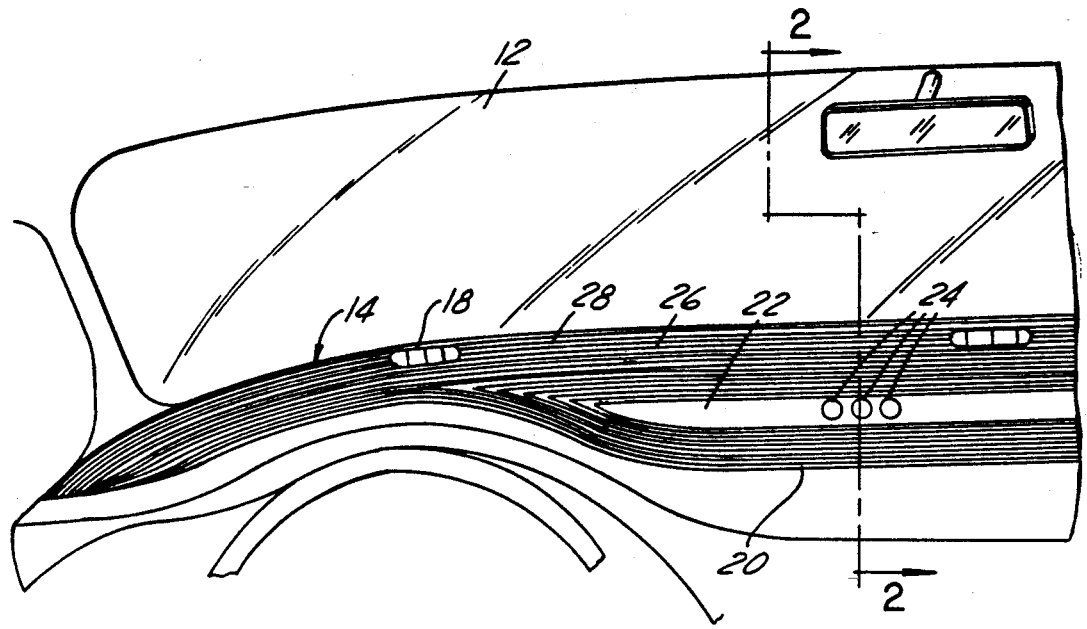
FIG. 1 is a fragmentary perspective view of the instrument panel of an automotive vehicle as seen by a person occupying the driver's seat and looking in a forward and slightly downward direction, the instrument panel shelf being constructed in accordance with the present invention.

Referring now more particularly to the drawings, the passenger compartment of an automobile has a cowl structure 10 and a windshield 12 which slants upwardly and rearwardly from the cowl structure at a severe rake, shown as about 30 degrees to the horizontal shelf 16 of the instrument panel 14. The instrument panel 14 is mounted on the cowl structure and the shelf 16 comprises an upper wall portion 18 and a lower wall portion 20 to the rear of and in a plane beneath the upper wall portion. The upper and lower wall portions of the shelf are horizontal. A generally upright wall portion 22 connects the rear edge of the upper wall portion and the front edge of the lower wall portion. The instrument panel has one or more instruments 24 in the generally upright wall portion 22. The instruments are observable by the driver and are for indicating vehicle condition and/or performance, such, for example, as a speedometer, fuel and temperature gages, etc. Light bulbs 25 are provided for illuminating these instruments at night.

The upper and lower wall portions are each formed on the top surface with a multiplicity of generally parallel, laterally extending, alternate grooves 26 and ridges 28 which extend generally parallel to the windshield 12. The grooves and ridges are generally V-shaped and each is defined by a forwardly facing surface 30 and a rearwardly facing surface 32. The forwardly facing surfaces are each inclined upwardly and rearwardly at an angle selected to insure the driver's eyes can't see the light reflected from the forwardly facing surfaces 30 reflected as an image or glare in the windshield 12 as this reflected light will pass beneath the usual eye level represented by the line 49. The forwardly facing surfaces 30 are more highly illuminated by ambient light passing through the windshield and by light bulbs 25 than are the rearwardly facing surfaces 32 because of the angle of ambient light, generally indicated at 40, 42. Some light reflected from the rearwardly facing surfaces 32 will be reflected into eye area 49 as indicated by lines 44, 48 and 46, 50 but this is dimmer and does not cause a serious problem. All of the forwardly facing surfaces of the upper wall portion 18 are preferably inclined at the same angle. The most effective angle of the forwardly facing surfaces for blocking reflected sunlight has been found to be about 25 degrees to the vertical.

The adjacent forwardly and rearwardly facing surfaces preferably meet at the bottoms of the grooves in sharp valleys 33, and at the tops of the ridges in sharp crests 34. These forwardly and rearwardly facing surfaces are preferably planar surfaces. The depth of the grooves is preferably about 0.020 inches.

In accordance with the present invention, most of the rays of sunlight 40 and 42 are prevented from being reflected along lines 44 and 46 but instead are blocked by the forwardly facing surfaces 30.

Figure 2:
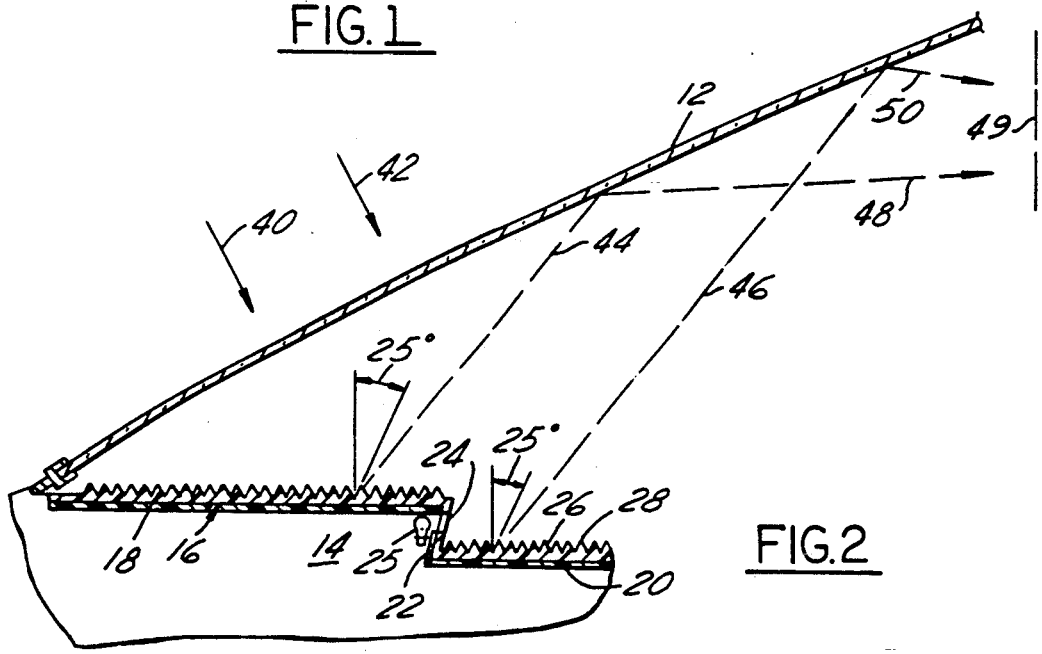
FIG. 2 is a sectional view taken on the line 2—2 in FIG. 1.
Figure 3:
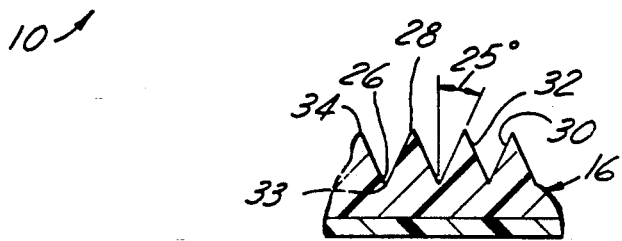
FIG. 3 is an enlarged view of a portion of the instrument panel shelf as shown within the circle in FIG. 2.

The rearwardly facing surfaces 32 would be more effective if they were more nearly vertical, but for practical purposes of tooling feasibility for mass production, an angle as indicated in FIGS. 2 and 3 is acceptable, this angle also being about 25 degrees to the vertical.

Preferably the instrument panel shelf 16 has a dull finish and is black or very dark in color in order to absorb most of the light impinging on it. That portion which is not absorbed may be reflected but is redirected so as to avoid the eyes of the driver.

Sunlight may enter the windshield at different angles depending upon the time of day. When the sun is high in the sky at noontime in the U.S. the sun's rays 40 and 42 usually enter the windshield at about the angle shown. When the sun is low in the sky during early and late daytime hours, the rays of sunlight enter the windshield at a lower angle, as a result of which the forwardly facing surfaces 30 of grooves 26 are also effective in blocking reflected light. As stated above, for best results in dealing with reflected sunlight, the forwardly facing groove surfaces 30 are preferably inclined at an angle of about 25 degrees to the vertical.

Light from the instruments 24 in wall portion 22 also strikes the surfaces 30 and 32 of the lower wall portion. The result is the same as with natural sunlight.

What is claimed is:

1. In a motor vehicle having a cowl structure, a windshield inclined upwardly and rearwardly from the cowl structure at about 30° to the horizontal, and an instrument panel mounted on the cowl structure, the improvement wherein said instrument panel has a shelf beneath said windshield, said shelf having an upper generally horizontal wall portion and a lower generally horizontal wall portion rearwardly of said upper wall portion and a generally upright wall portion between and connecting said upper and lower wall portions, at least one instrument in said generally upright wall portion provided with illumination and observable by the vehicle operator, each of said upper and lower wall portions being formed with a multiplicity of laterally extending, alternate grooves and ridges, each of said grooves and ridges being defined by a forwardly facing surface and a rearwardly facing surface, the grooves and ridges extending generally parallel to the windshield, said forwardly facing surfaces each being planar surfaces inclined upwardly and rearwardly with respect to the windshield at an angle to the vertical of about 25 degrees to prevent reflection of light upwardly to the windshield and thence reflected from the windshield into a vehicle operator's eye area or directly from the shelf into a vehicle operator's eye area, said forwardly facing surfaces and rearwardly facing surfaces having a dull finish and being dark in color.

2. In a motor vehicle as defined in claim 1, wherein each of said rearwardly facing surfaces are planar surfaces inclined at an angle of about 25 degrees to the vertical, the adjacent forwardly and rearwardly facing surfaces meet at the bottoms of said grooves in sharp valleys and at the tops of said ridges in sharp crests, and said grooves have a depth of about 0.020 inches.

3. In a motor vehicle having a cowl structure, a windshield inclined upwardly and rearwardly from the cowl structure, and an instrument panel mounted on the cowl structure, the improvement wherein said instrument panel has a shelf beneath said windshield, said shelf having a generally horizontal wall portion formed with a multiplicity of laterally extending, alternate grooves and ridges, each of said grooves and ridges being defined by a forwardly facing surface and a rearwardly facing surface, the grooves and ridges extending generally parallel to the windshield, said forwardly facing surfaces each being planar surfaces inclined upwardly and rearwardly with respect to the windshield at an angle to the vertical of about 25 degrees to prevent reflection of light upwardly to the windshield and thence reflected from the windshield into a vehicle operator's eye area or directly from the shelf into a vehicle operator'eye area, the adjacent forwardly and rearwardly facing surfaces meeting at the bottoms of said grooves in sharp valleys and at the tops of said ridges in sharp crests, said grooves having a depth of about 0.020 inches, and said forwardly facing surfaces and rearwardly facing surfaces having a dull finish and being dark in color.

* * * * *